(12) United States Patent
Chapman

(10) Patent No.: US 6,725,595 B1
(45) Date of Patent: Apr. 27, 2004

(54) PORTABLE ROD AND REEL DEVICE UTILIZING TRIGGER-ACTUATED LINE RELEASE AND BRAKING MECHANISM

(76) Inventor: Jack Chapman, 3163 Geneva School Rd., Bremen, OH (US) 43107

( * ) Notice: Subject to any disclaimer, the term of this patent is extended or adjusted under 35 U.S.C. 154(b) by 0 days.

(21) Appl. No.: 10/351,716

(22) Filed: Jan. 28, 2003

(51) Int. Cl.[7] .............................................. A01K 97/10
(52) U.S. Cl. ........................ 43/20; 43/18.1 HR; 43/19
(58) Field of Search ............................ 43/18.1 HR, 19, 43/20

(56) References Cited

U.S. PATENT DOCUMENTS

| | | | | |
|---|---|---|---|---|
| 1,632,522 A | * | 6/1927 | Thayer | 43/20 |
| 2,578,477 A | * | 12/1951 | Hurd | 43/20 |
| 2,600,259 A | * | 6/1952 | Palmer | 43/20 |
| 2,746,695 A | * | 5/1956 | Clay | 242/229 |
| 2,752,717 A | * | 7/1956 | Lind | 43/20 |
| 2,783,952 A | * | 3/1957 | Clay | 242/233 |
| 3,001,316 A | * | 9/1961 | Fefelov | 43/19 |
| 3,261,123 A | * | 7/1966 | Guliotta | 43/19 |
| 3,401,480 A | * | 9/1968 | Halstead | 43/19 |
| 3,413,748 A | * | 12/1968 | Kragh | 43/19 |
| 3,417,500 A | * | 12/1968 | Carabasse | 43/18.1 HR |
| 3,447,254 A | * | 6/1969 | Sobel et al. | 43/18.1 HR |
| 3,491,475 A | * | 1/1970 | Mann et al. | 43/20 |
| 3,618,253 A | * | 11/1971 | Edwards et al. | 43/26 |
| 4,027,419 A | * | 6/1977 | Popeil | 43/18.1 CT |
| 4,110,929 A | * | 9/1978 | Weigand | 43/19 |
| 4,127,956 A | * | 12/1978 | Hertkorn | 43/19 |
| 4,133,131 A | | 1/1979 | Davy | |
| 4,167,828 A | * | 9/1979 | Sarah | 43/20 |
| 4,175,716 A | * | 11/1979 | Reichow | 242/234 |
| 4,176,819 A | | 12/1979 | Lowe | |
| 4,177,595 A | | 12/1979 | Chon | |
| D306,638 S | * | 3/1990 | Lerch | D22/137 |
| 5,444,934 A | * | 8/1995 | LaTouche | 43/18.1 CT |
| 5,588,244 A | * | 12/1996 | Akiba et al. | 43/24 |
| D377,676 S | * | 1/1997 | Robbins et al. | D22/138 |
| 5,695,139 A | * | 12/1997 | Murphy | 242/239 |
| 5,715,952 A | | 2/1998 | Chichetti | |
| 5,832,653 A | * | 11/1998 | Tsurufuji | 43/24 |
| 5,881,489 A | * | 3/1999 | Young | 43/20 |
| 5,885,087 A | | 3/1999 | Thomas | |

FOREIGN PATENT DOCUMENTS

JP 6-303879 * 11/1994

* cited by examiner

Primary Examiner—Robert P. Swiatek
Assistant Examiner—David Parsley
(74) Attorney, Agent, or Firm—John D. Gugliotta; P. Jeff Martin

(57) ABSTRACT

A portable rod and reel device utilizing trigger-actuated line release and braking mechanism is provided in which a fishing line reel of an otherwise conventional design is integrated with a trigger-actuated line release and braking mechanism. The reel is based upon a conventional spincast reel design for winding and releasing a length of fishing line. The reel is mounted and enclosed within a main housing. A prolate void volume is formed throughout a central portion of the main housing, through which fingers pass, thus facilitating a firm grasp of the main housing. A hollow rod is attached to an end of the main housing. A hook restraint is removably attached to an end of the hollow rod. A trigger element functions so as to allow for both the release and braking of fishing line in a controlled, easy manner through conjunctive engagement with the reel.

5 Claims, 5 Drawing Sheets

PORTABLE ROD AND REEL DEVICE UTILIZING TRIGGER-ACTUATED LINE RELEASE AND BRAKING MECHANISM

RELATED APPLICATIONS

The present invention was first described in a Disclosure Document Registration No. 496,737 filed on Jul. 3, 2001 under 35 U.S.C. §122, 37 C.F.R. §1.14, and MPEP§1706. There are no previously filed, nor currently any co-pending applications, anywhere in the world.

BACKGROUND OF THE INVENTION

1. Field of the Invention

The present invention relates generally to an improved fishing rod and reel device and, more particularly, to an improved fishing rod and reel device having an integrated trigger-actuated line release and braking mechanism.

2. Description of the Related Art

A great number of people around the world enjoy fishing. Whether fishing for food or for the sport of it, the calmness and serenity of the sport coupled with the excitement of landing "the big one" makes fishing a popular pastime.

As a result of this popularity, many improvements and variations of the "fishing rod" and "fishing reel" are known throughout the art. A search of the prior art did not disclose any patents that read directly on the claims of the instant invention.

Consequently, there is a need for a means by which a rod and reel can be formed in a convenient, portable fashion incorporating a trigger-actuated line release and braking mechanism.

SUMMARY OF THE INVENTION

It is therefore an object of the present invention to provide an improved fishing rod and reel apparatus.

It is a feature of the present invention to provide an improved fishing rod and reel integrated with a trigger-actuated line release and braking mechanism.

It is another object of the present invention to provide a hollow circular portion which snaps to the main housing to enclose and contain a conventional spincast reel.

It is another object of the present invention to provide a removable end cap.

It is another object of the present invention to provide a hook restraint for preventing inadvertent tangling of the fishing hook with other hooks, damage to articles in proximal location thereto, or inadvertent injury to persons.

Briefly described according to one embodiment of the present invention, a portable rod and reel device utilizing trigger-actuated line release and braking mechanism is provided in which a fishing line reel of an otherwise conventional design is integrated with a trigger-actuated line release and braking mechanism. The reel is based upon a conventional spincast reel design for winding and releasing a length of fishing line. The reel is suitably mounted and enclosed within an oblong-shaped main housing. The main housing includes a quick-release, snap-on hollow, circular portion having threads for threadedly receiving corresponding threads of a removable end cap.

A generally prolate void volume is formed throughout a central portion of the main housing, through which fingers-pass, thereby forming a gripping element for facilitating a firm grasp of the main housing.

A hollow rod member is included through which fishing line is passed. The rod member terminates into a line guide to which a hook restraint is removably held thereto.

Located frontal to reel is an arm support bracket mounted to an inner, upper sidewall of the main housing near the anterior end thereof. The arm support bracket functions to pivotally attach a pivoting arm.

A trigger-connection wire is mounted to a lower end of the arm support bracket and extends therefrom and attaches to a tapered projection of a trigger element. The trigger element, in conjunction with the trigger-connection wire and pivoting arm function so as to allow for both the release and braking of fishing line in a controlled, easy manner through conjunctive engagement with the spincast reel.

Advantages of the present invention include its portability, its self-contained design, and its trigger-actuated line release and braking mechanism.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTION OF THE PREFERRED EMBODIMENTS

Figure 1:
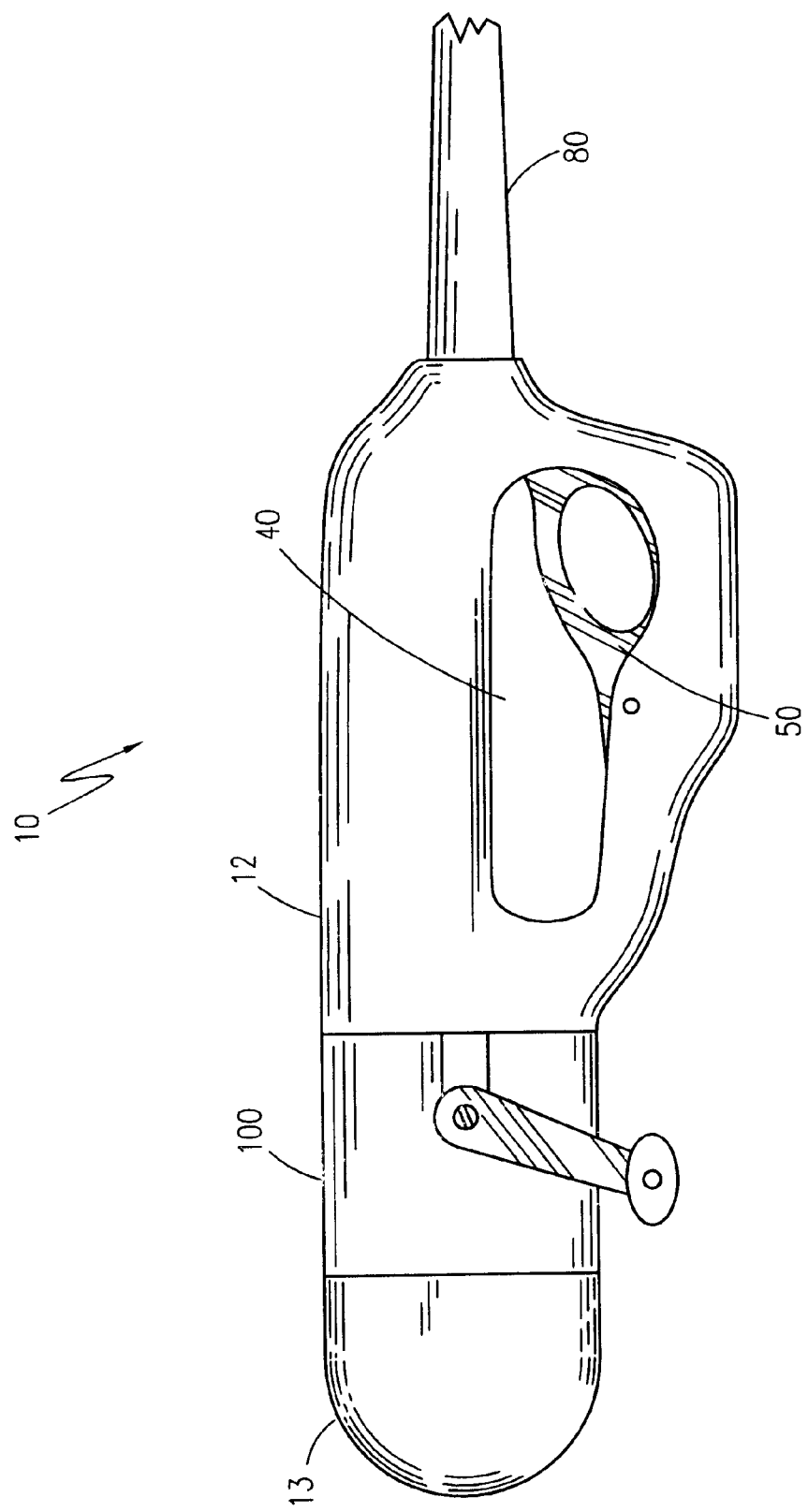
FIG. 1 is a perspective view of a portable rod and reel device utilizing trigger-actuated line release and braking mechanism according to the preferred embodiment of the present invention.

The best mode for carrying out the invention is presented in terms of its preferred embodiment, herein depicted-within the Figures.

1. Detailed Description of the Figures

Referring now to FIGS. 1–9, a portable rod and reel device utilizing trigger-actuated line release and braking mechanism 10 is shown according to the preferred embodiment of the present invention in which a fishing line reel 11 of an otherwise conventional design is integrated with a trigger-actuated line release and braking mechanism. The reel 11 is based upon a conventional spincast reel design for winding and releasing a length of fishing line 18. The reel 11 is suitably mounted and enclosed within a main housing 12. The main housing 12 is defined as having a generally hollow, oblong shape with an anterior end 14 opposite a posterior end 16. The anterior end 14 of the main housing 12 defines a quick-release, snap-on hollow, circular portion 100 which includes threads 28 for threadingly receiving corresponding threads 29 of a removable end cap 13 (to be described in greater detail below). The posterior end 16 of the main housing 12 along an upper portion thereof, includes a rod receiving cavity 19 within which a first end of an elongated, hollow rod member 80 is mounted. Fishing line 18 is passed from the fishing line exit portal 15 of the reel 11 through a body of the rod member 80 and through a second end of rod member 80 and through a line guide 82 formed of a conical projection having a line guide orifice 83 through which the fishing line 18 is passed.

The quick-release, snap-on hollow, circular portion 100 extends a longitudinal length from the anterior end 14 to a medial point 12a of the main housing 12. The circular portion 100 is configured so as to be snapped on and removably secured to an end of the main housing 12 at medial point 12a. The circular portion 100 includes a horizontally-oriented elongated slot 102 extending along a lateral circumferential sidewall of circular portion 100 for accommodating a connection arm 90 of a reel handle 92 of the reel 11, thus allowing for ease in attachment and removal of the circular portion 100 from the medial point 12a of the main housing 12. It is envisioned that the present invention is available wherein the reel handle 92 of a conventional spincast reel 11 is positioned on an opposite lateral circumferential sidewall of the circular portion 100, thus facilitating utilization of the present invention by left-handed users.

A generally prolate void volume 40 is formed throughout a central portion of the main housing 12, through which fingers pass, thereby forming a gripping element for facilitating a firm grasp thereof.

Figure 2:
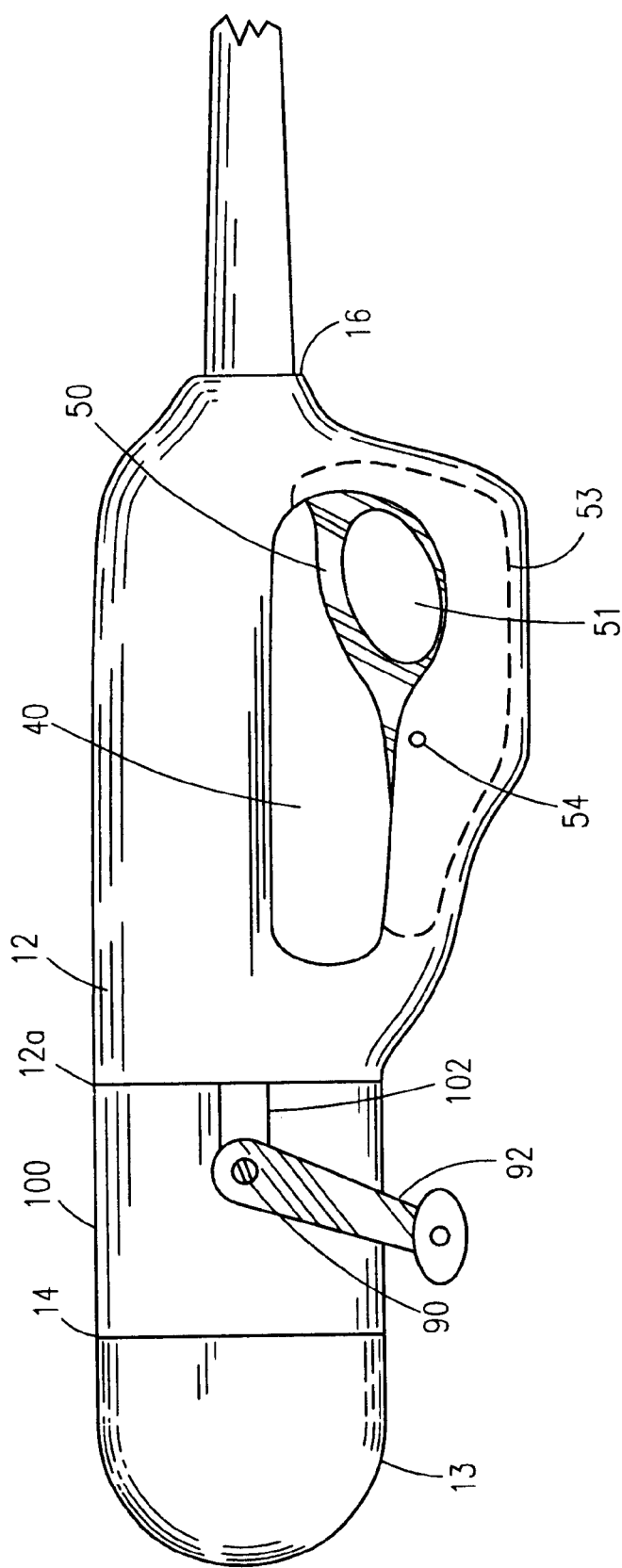
FIG. 2 is a side elevational view thereof.
Figure 3:
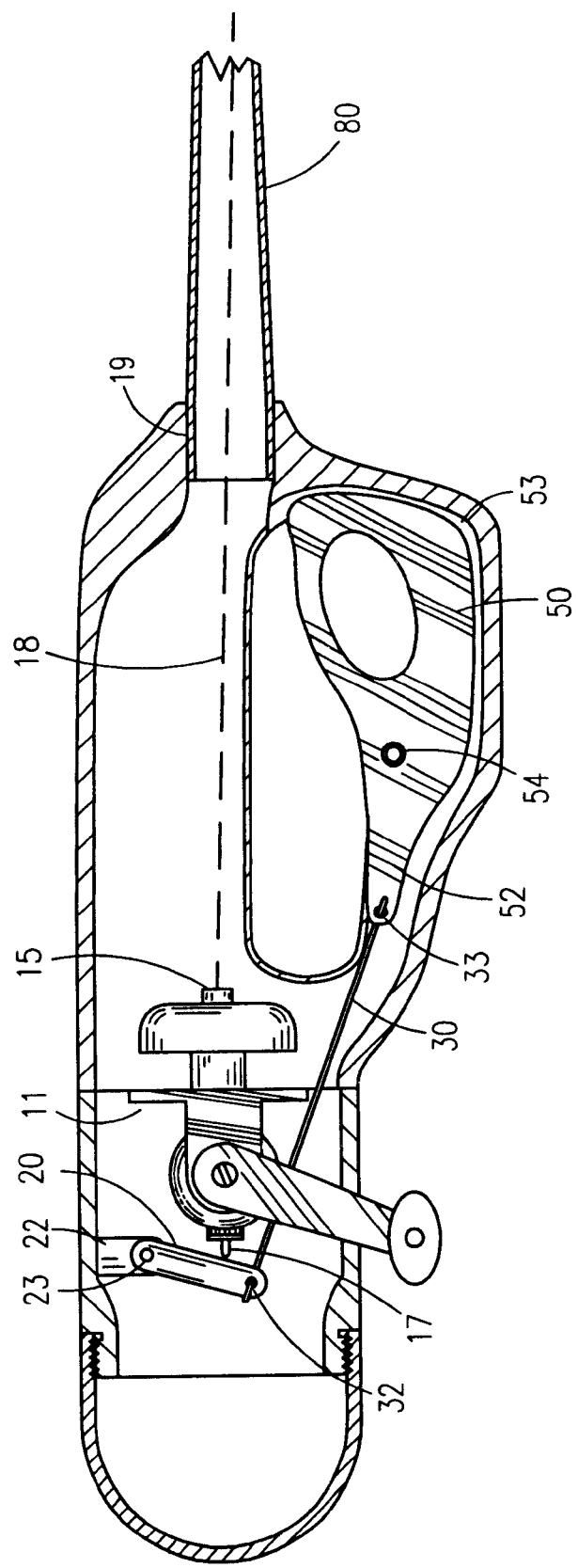
FIG. 3 is a cross-sectional view thereof.
Figure 4:
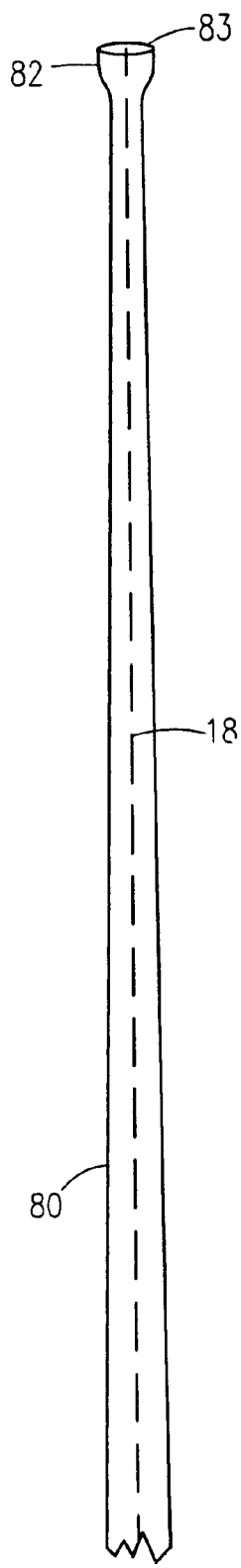
FIG. 4 is a partial side elevational view of the hollow rod member. according to the preferred embodiment of the present invention.
Figure 5:
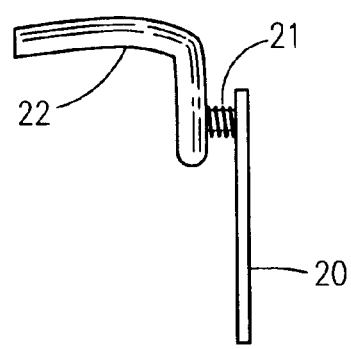
FIG. 5 is front end elevational view of the arm support bracket according to the preferred embodiment of the present invention

Referring more specifically to FIGS. 2 and 3, located frontal to reel 11 is an arm support bracket 22 mounted to an inner, upper sidewall of the main housing 12 near the anterior end 14 thereof. The arm support bracket 22 functions to pivotally attach, via a pivot pin 23, a pivoting arm 20 in a downwardly depending manner. The pivoting arm 20 is spring-biased via spring 21 so as to diverge in a direction slightly away from the reel 11 but remains in contact with a line release actuator button 17 thereof, as shown in FIG. 3.

A trigger-connection wire 30 is mounted via a first coupling pin 32 to a lower end of pivoting arm 20 and extends therefrom and attaches via a second coupling pin 33 to a tapered projection 52 of a trigger element 50. The function of the trigger-connection wire 30 will be described in greater detail below.

Referring now to FIGS. 1–3, the trigger element 50 is of an elongated configuration having a circular slot 51 formed therein opposite of tapered projection 52 so as to allow one's finger to pass therethrough and allow engagement thereby. The trigger element 50 pivotally resides within an elongated groove 53 formed within the main housing 12, being parallel with the prolate void volume 40, and wherein the trigger element 50 is designed to angularly reciprocate along the elongated groove 53 upon engagement by the finger of a user. A pivot pin 54, mounted through main housing 12, and through trigger element 50 anterior to circular slot 51, holds trigger element 50 within elongated groove 53.

The trigger element 50, in conjunction with the trigger-connection wire 30 and pivoting arm 20 function so as to allow for both the release and braking of fishing line 18 in a controlled, easy manner. Specifically, as the trigger element 50 is pulled upward, such operation engages the trigger-connection wire 30 to pull simultaneously upon pivoting arm 20, whereby pivoting arm 20 engages line release actuator button 17 of reel 11, thereby actuating release of fishing line 18, upon subsequent release of trigger element 50. A second pull on the trigger element 50 functions to apply a brake on the release of fishing line 18. Such function being particularly advantageous during times where user has missed his casting target. In such event, the user simply reels in the fishing line 18 and repeats the aforementioned steps. The conventional spincast reel 11 design (excluding associated components, namely trigger element 50, pivoting arm 20, and trigger-connection wire 30) for winding and releasing a length of fishing line 18 are well known in the art for performing in the above-described manner, and as such, will be obvious to a person of ordinary skill.

Figure 6:
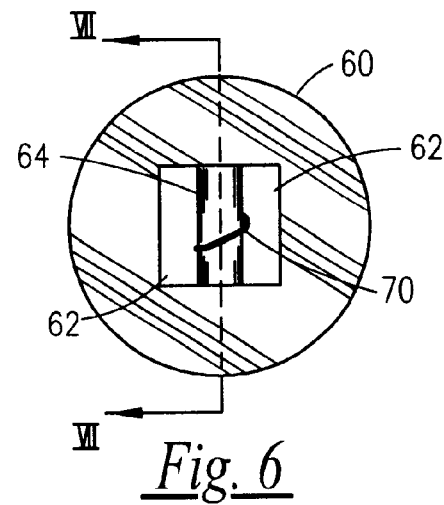
FIG. 6 is a front end view of the hook restraint.
Figure 7:
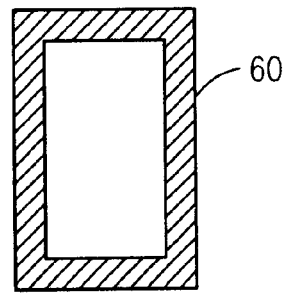
FIG. 7,is a cross-sectional view of the hook restraint taken along lines VII—VII of FIG. 6.
Figure 8:
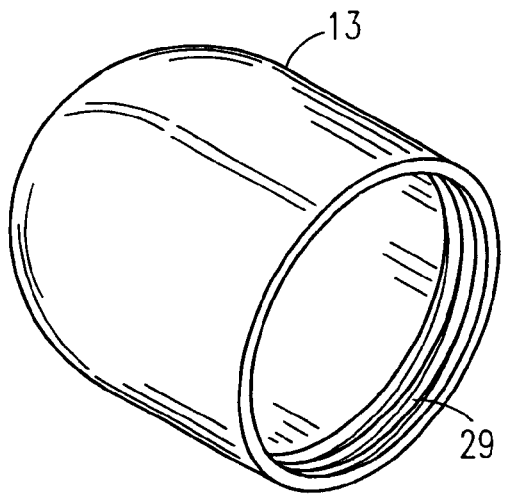
FIG. 8 is a perspective view of the end cap according to the preferred embodiment of the present invention.
Figure 9:
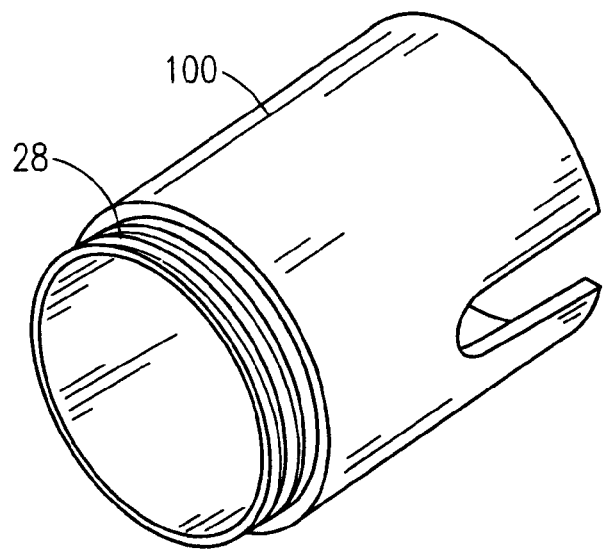
FIG. 9 is perspective view of the circular portion according to the preferred embodiment of the present invention.

Referring now to FIGS. 6 and 7, a hook restraint 60 of a hollow, generally circular configuration is slipped over the external circumferential surface of the line guide 82 of rod member 80 and is removably held thereto via mechanical interference-type fit. The hook restraint 60 defines a pair of elongated channels 62 separated by an integral central column 64, wherein elongated channels 62 are aligned in parallel for allowing passage and removable attachment of a fishing hook 70 therein. The hook restraint 60 functions to prevent inadvertent tangling of the fishing hook 70 with other hooks, damage to articles in proximal location thereto, or inadvertent injury to persons.

Finally, referring to FIGS. 1–3, and 8–9, the removable end cap 13 is of a hollow, concave configuration. The removable end cap 13 defines threads 29 for threadedly receiving corresponding threads 28 of the quick-release, snap-on hollow, circular portion 100. The removable end cap 13 facilitates easy access to the pivoting arm 20 and the reel 11.

2. Operation of the Preferred Embodiment

In operation, the user pulls the trigger element 50 to a raised position and while casting, releases the trigger element 50, thereby actuating release of fishing line 18. A second pull on the trigger element 50 by user functions to apply a brake on the release of fishing line 18. Such function being particularly advantageous during times where user has missed his casting target. In such event, the user simply reels in the fishing line 18 and repeats the aforementioned steps.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents. Therefore, the scope of the invention is to be limited only by the following claims.

What is claimed is:

1. A rod and reel device comprising:
   a main housing, said main housing having a generally hollow, oblong shape with an anterior end opposite a posterior end, and wherein said main housing having a generally prolate void volume formed throughout a central portion of said main housing, through which fingers pass, thereby forming a gripping element for facilitating a firm grasp of said main housing;
   a quick-release, snap-on hollow, circular portion, said quick-release, snap-on hollow circular portion being defined at said anterior end of said main housing, wherein said quick-release, snap-on hollow, circular portion includes threads for threadingly receiving corresponding threads of a removable end cap;

a trigger-actuated line release and braking mechanism, said trigger-actuated line release and braking mechanism is housed within said main housing, said trigger-actuated line release and braking mechanism incorporating a traditional spincast reel for winding and releasing a length of fishing line, wherein fishing line is passed from a fishing line exit portal of the traditional spincast reel;

a trigger element, said trigger element is of an elongated configuration defining a tapered projection, said trigger element pivotally resides within an elongated groove formed within said main housing, being parallel with a prolate void volume formed throughout a central portion of said main housing through which fingers pass, thus facilitating a firm grasp of said main housing, and wherein said trigger element further having a circular slot formed therein opposite said tapered projection so as to allow user's finger to pass through said circular slot and allow engagement by user's finger, and whereby said trigger element is adapted to angularly reciprocate along said elongated groove upon engagement by the finger of a user;

an arm support bracket, said arm support bracket is located frontal to the traditional spincast reel and mounted to an inner, upper sidewall of said main housing near said anterior end thereof, wherein said arm support bracket functions to pivotally attach a pivoting arm via a pivot pin in a downwardly depending manner, and wherein said pivoting arm is spring-biased via a spring so as to diverge in a direction slightly away from the traditional spincast reel but remaining in contact with a line release actuator button of the traditional spincast reel; and a trigger-connection wire, said trigger-connection wire is mounted via a first coupling pin to a lower end of said pivoting arm, and wherein said trigger-connection wire extends from said pivoting arm and attaches via a second coupling pin to said tapered projection of said trigger element; and an elongated hollow rod member, said elongated hollow rod member having a first end mounted within a rod receiving cavity formed at said posterior end of said main housing along an upper portion thereof, and wherein fishing line is passed from the fishing line exit portal of the traditional spincast reel and through said elongated hollow rod member.

2. The rod and reel device of claim 1, wherein said trigger element is held within said elongated groove of said main housing via a pivot pin being mounted through said main housing, and through said trigger element anterior to said circular slot, whereupon manual upward pulling of said trigger element actuates said trigger-connection wire to pull simultaneously upon said pivoting arm, whereby pivoting arm engages the line release actuator button of the traditional spincast reel, thereby actuating release of fishing line, upon subsequent release of said trigger element, and whereupon a second pull on said trigger element functions to apply a brake on release of fishing line.

3. The rod and reel device of claim 1, further comprising a hook restraint affixed to said rod member, said hook restraint is of a hollow, generally circular configuration defining a pair of elongated channels allowing for passage and removable attachment of a fishing hook, wherein said pair of elongated channels being separated by an integral central column, and wherein said hook restraint is slipped over an external circumferential surface of said elongated hollow rod member, and wherein said hook restraint is removably held to said line guide via mechanical interference-type fit, whereby said hook restraint functions to prevent inadvertent tangling of the fishing hook with other hooks, damage to articles in proximal location thereto, or inadvertent injury to persons.

4. The rod and reel device of claim 1, wherein said removable end cap is of a hollow, concave configuration being easily unscrewed from said quick-release, snap-on hollow, circular portion so as to facilitate easy access to a pivoting arm and the traditional spincast reel.

5. The rod and reel device of claim 1, wherein said quick-release, snap-on hollow circular portion includes a horizontally-oriented elongated slot extending along a lateral circumferential sidewall of said quick-release, snap-on hollow circular portion for accommodating a connection arm of a reel handle of the traditional spincast reel, thus allowing for ease in attachment and removal of said quick-release, snap-on hollow circular portion from a medial point of said main housing.

* * * * *